US008119014B2

(12) United States Patent  
Soto et al.

(10) Patent No.: US 8,119,014 B2
(45) Date of Patent: Feb. 21, 2012

(54) SYSTEMS AND METHODS TO REMOVE LIQUID PRODUCT AND FINES FROM A SLURRY REACTOR

(75) Inventors: Jorge L. Soto, Centreville, VA (US); Costas A. Coulaloglou, Wilmington, DE (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 83 days.

(21) Appl. No.: 12/592,168

(22) Filed: Nov. 20, 2009

(65) Prior Publication Data

US 2010/0160460 A1   Jun. 24, 2010

Related U.S. Application Data

(60) Provisional application No. 61/203,525, filed on Dec. 23, 2008.

(51) Int. Cl.
*B01D 21/00* (2006.01)
*B01D 37/00* (2006.01)
*C07C 27/00* (2006.01)

(52) U.S. Cl. ......... 210/800; 210/806; 210/253; 518/700
(58) Field of Classification Search ................... 518/700; 210/806, 253, 800
See application file for complete search history.

(56) References Cited

U.S. PATENT DOCUMENTS

| 4,230,556 A | 10/1980 | Carr et al. |
| 5,157,054 A | 10/1992 | Herbolzheimer et al. |
| 5,776,988 A | 7/1998 | Chaumette et al. |
| 5,866,621 A | 2/1999 | Behrmann et al. |
| 5,900,159 A | 5/1999 | Engel et al. |
| 6,068,760 A | 5/2000 | Benham et al. |
| 6,096,789 A | 8/2000 | Clerici et al. |
| 6,331,196 B1 | 12/2001 | Alperovitch |
| 6,420,497 B1 | 7/2002 | Kufeld et al. |
| 6,462,098 B1 | 10/2002 | Vogel et al. |
| 6,716,887 B2 | 4/2004 | Newton et al. |
| 6,730,221 B2 | 5/2004 | Bohn et al. |
| 6,833,078 B2 | 12/2004 | Espinoza et al. |
| 6,903,141 B2 | 6/2005 | Zhou et al. |
| 7,078,439 B2 | 7/2006 | Odueyungbo et al. |
| 7,111,738 B2 | 9/2006 | Allen, III |
| 2004/0050806 A1 | 3/2004 | Espinoza et al. |
| 2004/0250973 A1 | 12/2004 | Johns et al. |
| 2005/0004238 A1 | 1/2005 | Clerici et al. |
| 2005/0109715 A1 | 5/2005 | Stoy et al. |
| 2007/0014703 A1 | 1/2007 | Schweitzer et al. |
| 2007/0039852 A1 | 2/2007 | Khakdaman et al. |
| 2007/0161715 A1 | 7/2007 | Long et al. |

OTHER PUBLICATIONS

J. K. Neathery, et al., Quarterly Report, "Separation of Fischer-Tropsch Wax Products from Ultrafine Iron Catalyst Particles", Reporting period—Apr. 1, 2005 to Sep. 30, 2005, The University of Kentucky Center for Applied Energy Research, DE-FC26-03NT41965.

*Primary Examiner* — Jafar Parsa
(74) *Attorney, Agent, or Firm* — Estelle C. Bakun; David M. Weisberg

(57) ABSTRACT

The present invention provides methods and means for separating slurry liquid from catalyst in a three-phase slurry process. The embodiments of the invention are characterized by conducting the three-phase process under conditions to provide an upper region in the slurry that contains a catalyst concentration of about 20 wt % or less and a lower region with a catalyst concentration higher than about 20 wt %. A portion of the slurry in this upper region is degassed and passed to liquid-solid separation devices for recovery of liquid product.

6 Claims, 5 Drawing Sheets

SYSTEMS AND METHODS TO REMOVE LIQUID PRODUCT AND FINES FROM A SLURRY REACTOR

Non-Provisional Application based on Provisional Application No. 61/203,525 filed Dec. 23, 2008.

FIELD OF THE INVENTION

The present invention relates generally to the separation of either catalyst, reaction product or both in a three-phase liquid slurry process. More particularly, the present invention is concerned with the use of such systems and methods in a process for the synthesis of hydrocarbons in which a mixture of hydrogen and carbon monoxide are contacted with a slurry of catalyst particles in a liquid in a three-phase slurry reactor.

BACKGROUND OF THE INVENTION

Three-phase slurry processes, particularly those occurring in bubble columns, are widely reported in scientific literature and, hence, are well known to those skilled in the art. An example of such a three-phase slurry process is the production of hydrocarbons by means of the Fischer-Tropsch process.

Typically, a Fischer-Tropsch hydrocarbon synthesis process is conducted by contacting a stream of synthesis gas (comprising $H_2$ and CO) with a liquid suspension of solid catalyst. The synthesis gas generally will have a $H_2$/CO molar ratio of from 1:1 to 3:1. The dispersing liquid is primarily linear hydrocarbon reaction product. To facilitate contact between catalyst and the synthesis gas, the gas is fed into the bottom of the bubble column through a gas distributor that produces small gas bubbles.

Normally, slurry phase processes are conducted under conditions sufficient to prevent slumping of the bed, that is, under conditions that prevent catalyst particles from accumulating near the bottom of the bubble column. Thus, the settling tendency of the catalyst particles is opposed by dispersion forces created by the rising gas bubbles from the gas fed into the bottom of the bubble column.

Because it is necessary to maintain the slurry in the reactor at a constant level, liquid products are continuously or periodically removed from the reactor. In doing so, however, it is important to separate dispersed catalyst particles from the liquid being removed to maintain a constant inventory of catalyst in the reactor. Generally, the separation is conducted in a filtration zone located inside the slurry bed. The filtration zone typically comprises cylindrical filtering media through which liquid product passes from the exterior to the interior of the filtering media where it is collected and removed from the reactor. In some reactor designs, liquid product is filtered in an external filtration system.

One of the problems associated with filtration systems is the decrease in filter efficiency over time, necessitating remedial action such as backwashing the filter media, and eventually removing and cleaning the filter element or replacing it. The decrease in filter efficiency is due mainly to the presence in the liquid product of very small catalyst particles known as "fines," which cause filters to plug. The presence of catalyst fines in the slurry liquid is due to the attrition of the catalyst that occurs over time under the turbulent hydrodynamic conditions existing in the reactor vessel.

It should also be mentioned that in external filter systems the catalyst may become deactivated because it is not always maintained at process conditions.

Thus, there is a need for increasing the effectiveness of separating catalyst particles from liquid products in a three-phase slurry process. There also is a need for controlling the fines content in a slurry reactor to prevent excessive filter backwashing and fouling. Additionally, there is a need for removing liquid product from a slurry process without the use of filters. These and other needs to are addressed by the present invention.

SUMMARY OF THE INVENTION

Accordingly, the present invention provides methods and means for separating slurry liquid from catalyst in a three-phase slurry process. The embodiments of the invention are characterized by conducting the three-phase process under conditions to provide an upper region in the slurry bed where the concentration of the solids in the slurry is less than about 20 wt %. A portion of the three-phase slurry in the upper region is degassed and passed to liquid-solid separation devices other than filters.

In a preferred embodiment, the slurry process is operated in a slumped-bed mode, thereby providing an upper region in the slurry bed where the slurry solids concentration is less than about 20 wt % of solids.

The various embodiments of the invention will be described in the detailed description which follows.

DETAILED DESCRIPTION OF THE INVENTION

The present invention is applicable to chemical reactions which are carried out in a three-phase slurry reactor. A specific example of such reactions is the Fischer-Tropsch synthesis process, and for convenience, the invention will be described by specific reference to the Fischer-Tropsch hydrocarbon synthesis process.

Suitably, the reactor for a Fischer-Tropsch synthesis process conducted according to the present invention comprises a vertical vessel for containing a catalyst suspended in a liquid phase through which synthesis gas is bubbled.

As indicated previously, the synthesis gas comprises $H_2$ and CO in the molar ratio of from about 1:1 to about 3:1. In the present process, the ratio preferably is 2.1:1.

Any catalyst capable of being active in the Fischer-Tropsch reaction can be used in the present invention. Preferably, the catalyst will comprise effective amounts of Co and one or more of Re, Ru, Fe, Ni, Th, Zr, Hf, U, Mg and La on a suitable inorganic support material.

Those linear hydrocarbon reaction products that are liquids at reaction conditions comprise the slurry liquid in the reactor.

The Fischer-Tropsch reaction is carried out at temperatures in the range of about 320° F. to 850° F. and pressures in the range of 80 to 600 psi.

In a well dispersed Fischer-Tropsch slurry process, the synthesis gas is injected at or near the bottom of the reactor at a superficial gas velocity sufficient to overcome the settling velocity of catalyst particles.

Figure 5:
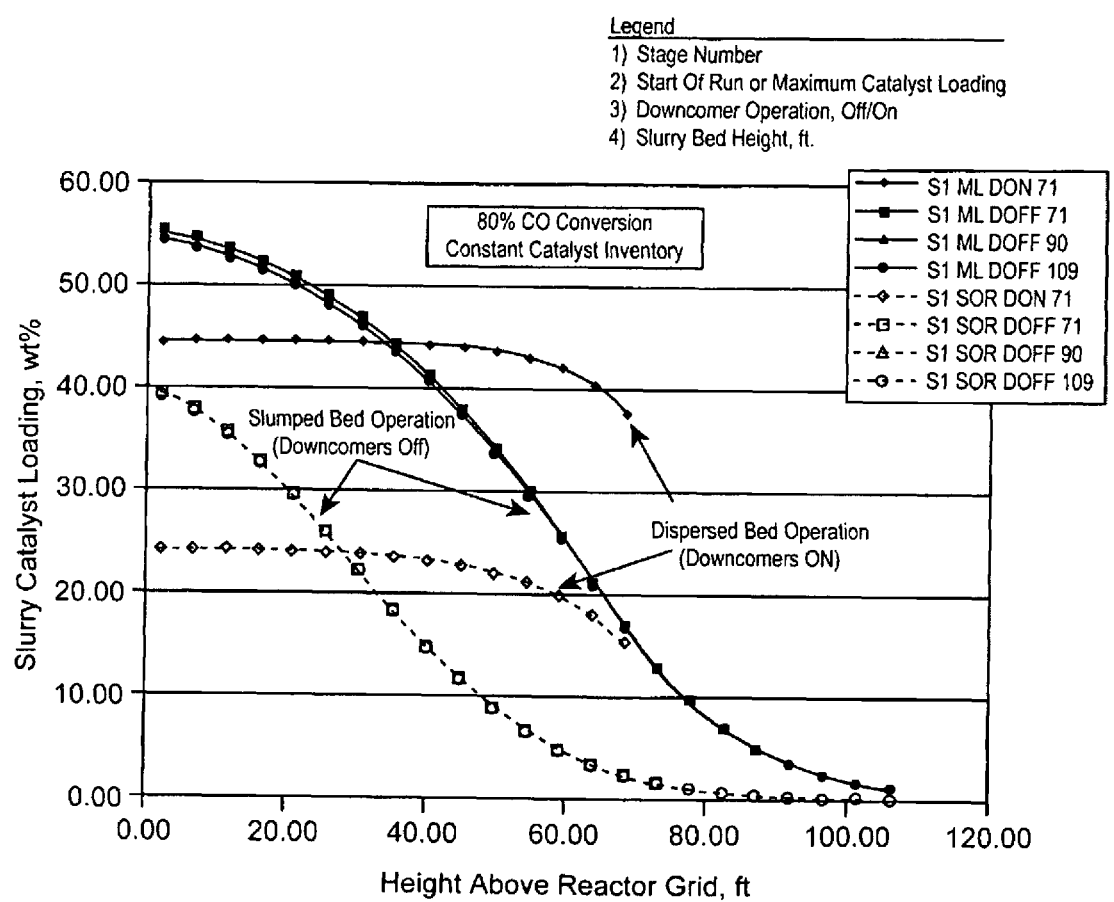
FIG. 5 is a graph showing the slurry catalyst loading versus bed height when operating in a slumped bed mode and a dispersed bed mode.

In the practice of the present invention, the synthesis gas is injected at or near the bottom of the reactor at a superficial velocity sufficient to provide a non-homogeneous slurry having an upper region and a lower region. The catalyst concentration in the upper region of the slurry bed will contain less than about 20 wt % of catalyst solids, preferably the solids concentration in the slurry will be less than 10 wt %, and most preferably the solids concentration will be less than 5 wt %. For example, FIG. 5 shows two examples of the slumped bed operation where the solids concentration in the upper region of the bed range between about 20 wt % and about 1 wt % catalyst solids.

The catalyst concentration profile along the reactor height in the slurry bed will depend, of course, not only on the gas velocity but also on the catalyst particle size, particle density, total loading of the catalyst, the height and diameter of the reactor, and the slurry liquid density and viscosity.

The catalyst particle size refers to the effective catalyst particle diameter. When used in this specification, the bulk catalyst refers to catalyst particles having an average size greater than or equal to about 10 microns, for example, in the range of about 10 to 150 microns. By fines is meant particles having a particle size below about 10 microns, for example, in the range of about 0.1 to 10 microns.

Basically, in the method of the present invention, the Fischer-Tropsch is operated in a slumped-bed mode. In one embodiment, this is achieved by using a reactor without internal downcomers and injecting the synthesis operating gas at or near the bottom of the reactor at a superficial gas velocity sufficient that the catalyst concentration in the upper region of the slurry is less than about 20 wt % solids. In another embodiment, the slumped-bed operation is achieved using a reactor that is provided with internal downcomers for circulating slurry in the reactor. These downcomers are sized and positioned in the reactor so that under operating conditions the concentration of catalyst solids in the slurry in the upper region of the slurry bed is less than about 20 wt %.

In the method of the invention, liquid in the upper region of the slurry containing less than about 20 wt % solids is degassed and passed to a liquid-solids separation device for separation of bulk solids. The bulk catalyst particles that are separated from the liquid are returned at or near the bottom of the reactor. The liquid separated may be subjected to a second-stage separation step for removal of fines and the liquid product may be sent for further processing, if needed.

The invention will now be described by reference to the accompanying drawings.

Figure 1:
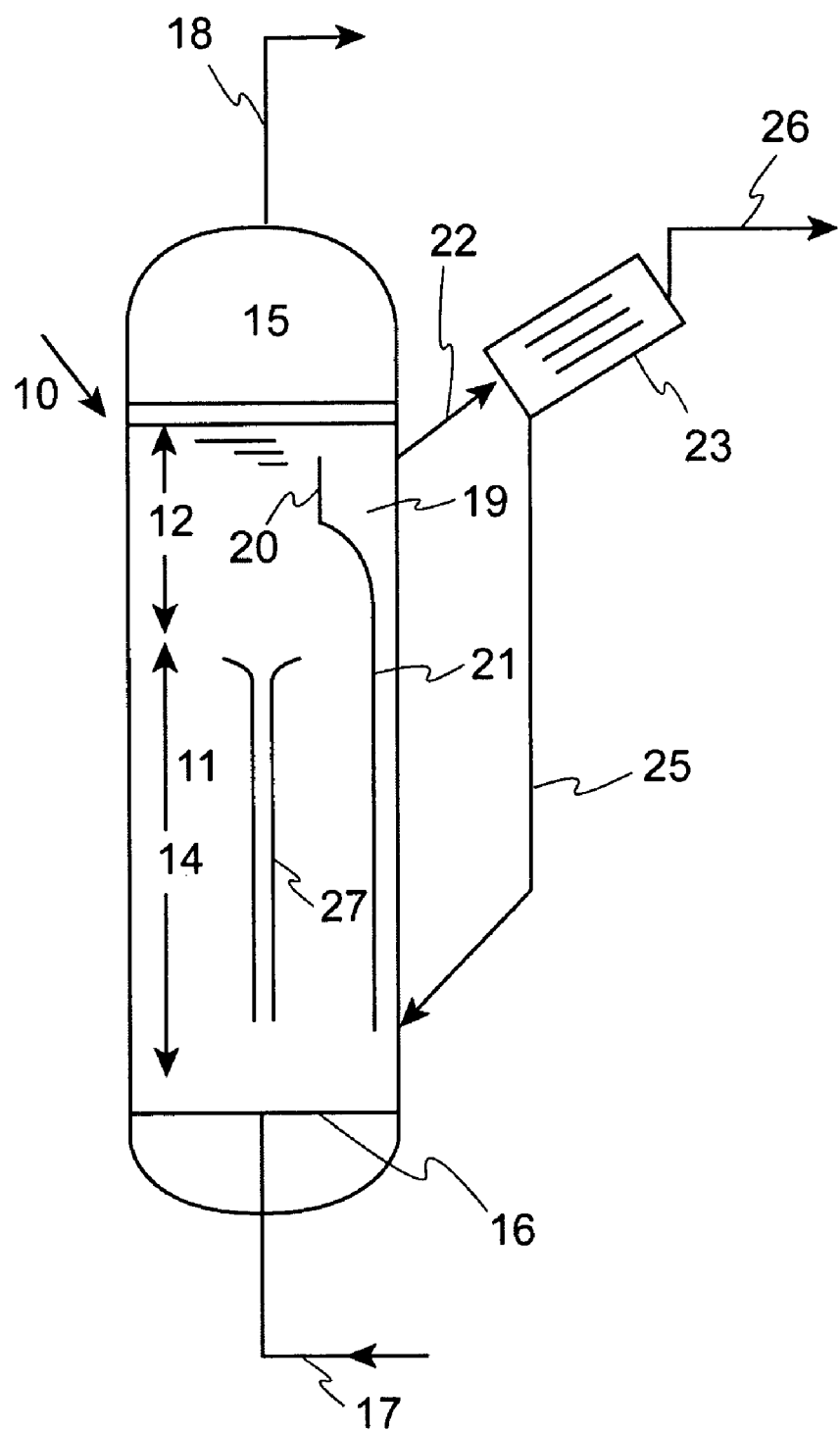
FIG. 1 is a schematic diagram illustrating an embodiment of the invention.

FIG. 1 shows a reactor vessel 10 containing a slurry liquid 11 which has an upper region 12 and a lower region 14. Vessel 10 includes a gas head space 15 and a gas distributor 16. Conduit means is provided for injecting synthesis gas into the slurry liquid for reaction therein. Conduit means 18 is provided for removing gaseous products from head space 15. Vessel 10 includes a gas disengaging zone 19 located in region 12. As shown in FIG. 1, the gas disengaging zone 19 is in the form of a cup-like top 20 on downcomer 21. Conduit means 22 is provided for removing degassed slurry for transfer to a liquid-solid separation device 23. In FIG. 1, separator 23 is shown representing an inclined plate separator other solid liquid separators may be used. Conduit means 25 is provided for returning bulk catalyst particles to the bottom region of the slurry liquid. Conduit 26 is provided for removing slurry liquid for the separation of catalyst fines in a second separation stage and for other processing as required.

Optionally, vessel 10 may include downcomers that do not span the entire length of slurry bed 11 and are located in the lower region 14 for circulating catalyst at the bottom of the reactor. Downcomer 27, shown in FIG. 1, represents one such downcomer.

Also, although vessel 10 does not require internal filters for removing product, internal filters (not shown) may be used.

Figure 2:
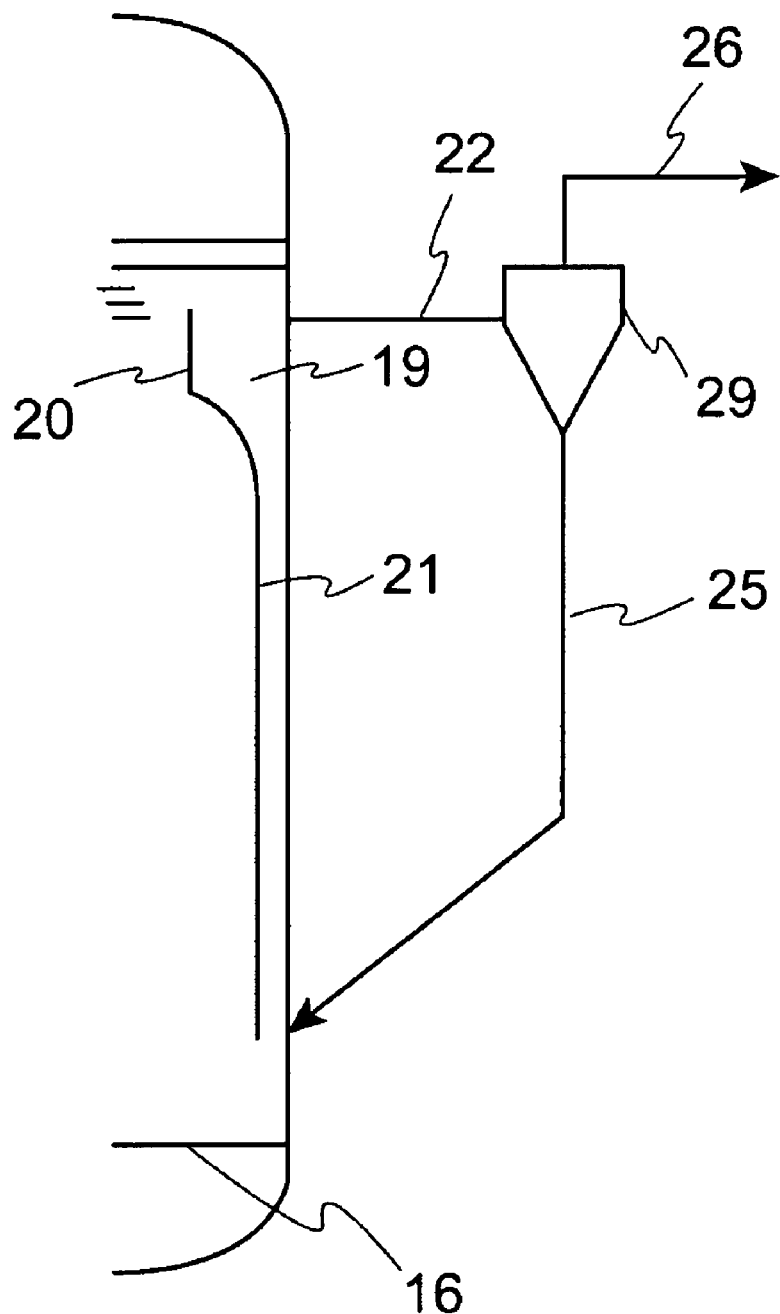
FIG. 2 is a partial schematic diagram illustrating use of an alternate separator in the practice of the invention.

In the embodiment shown in FIG. 2, a hydroclone 29 is used to separate the solids from the liquid. Thus, degassed slurry is transferred via conduit 22 to hydroclone 29, which separates the slurry stream into an overflow stream and a catalyst-containing underflow stream. The slurry liquid overflow stream is removed via conduit 26 for the separation of catalyst fines in a second separation stage and for other processing as required. The bulk catalyst is returned to the bottom region of the slurry liquid via conduit 25.

Figure 3:
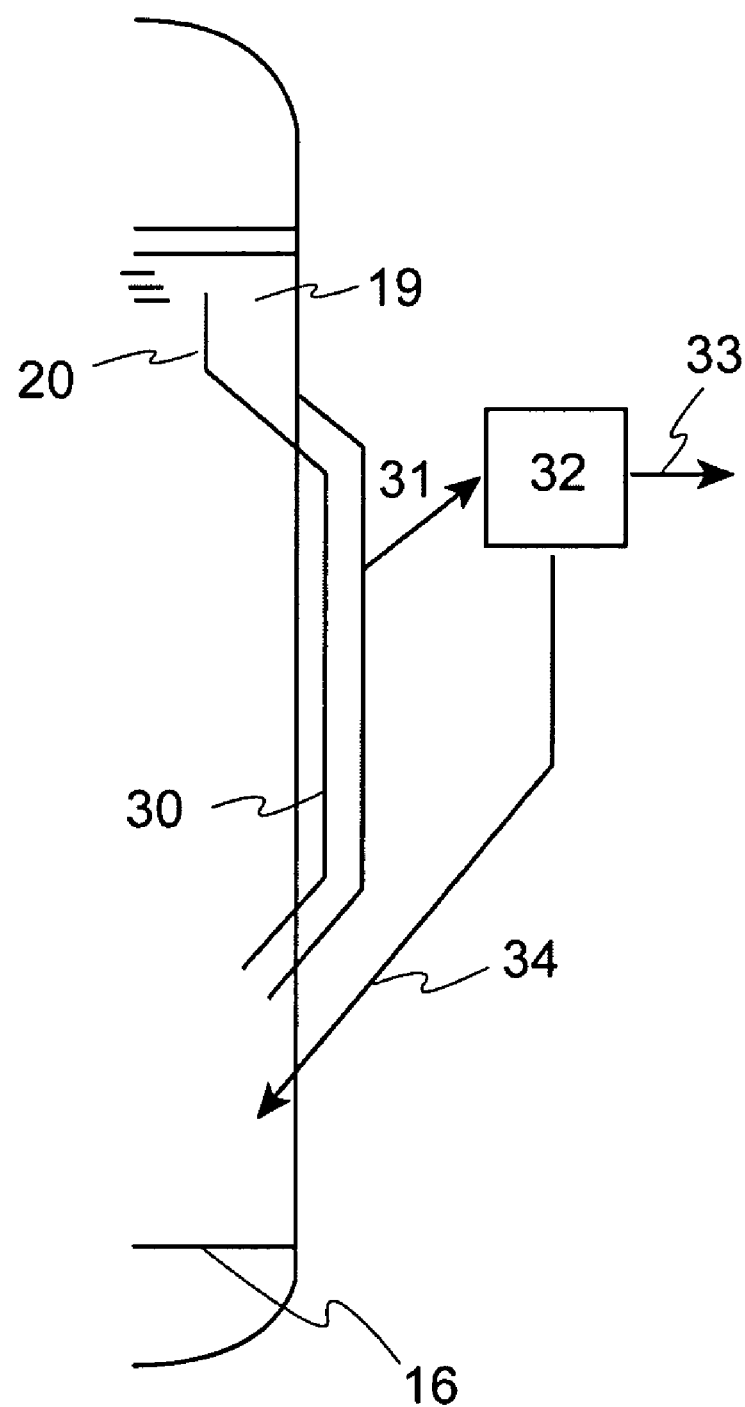
FIG. 3 represents a preferred embodiment of the invention in which the slurry reactor is provided with an external downcomer for removal of degassed slurry for separation according to the invention.

In yet another, and preferred, embodiment shown in FIG. 3, degassed slurry is withdrawn from the main vertical section 30 of an external downcomer via line 31 for separation in a liquid-solid separation device 32, such as an inclined plate separator or a hydroclone. Liquid is removed via line 33 for fines separation and any additional processing while bulk catalyst is returned to the slurry reactor via line 34.

Figure 4:
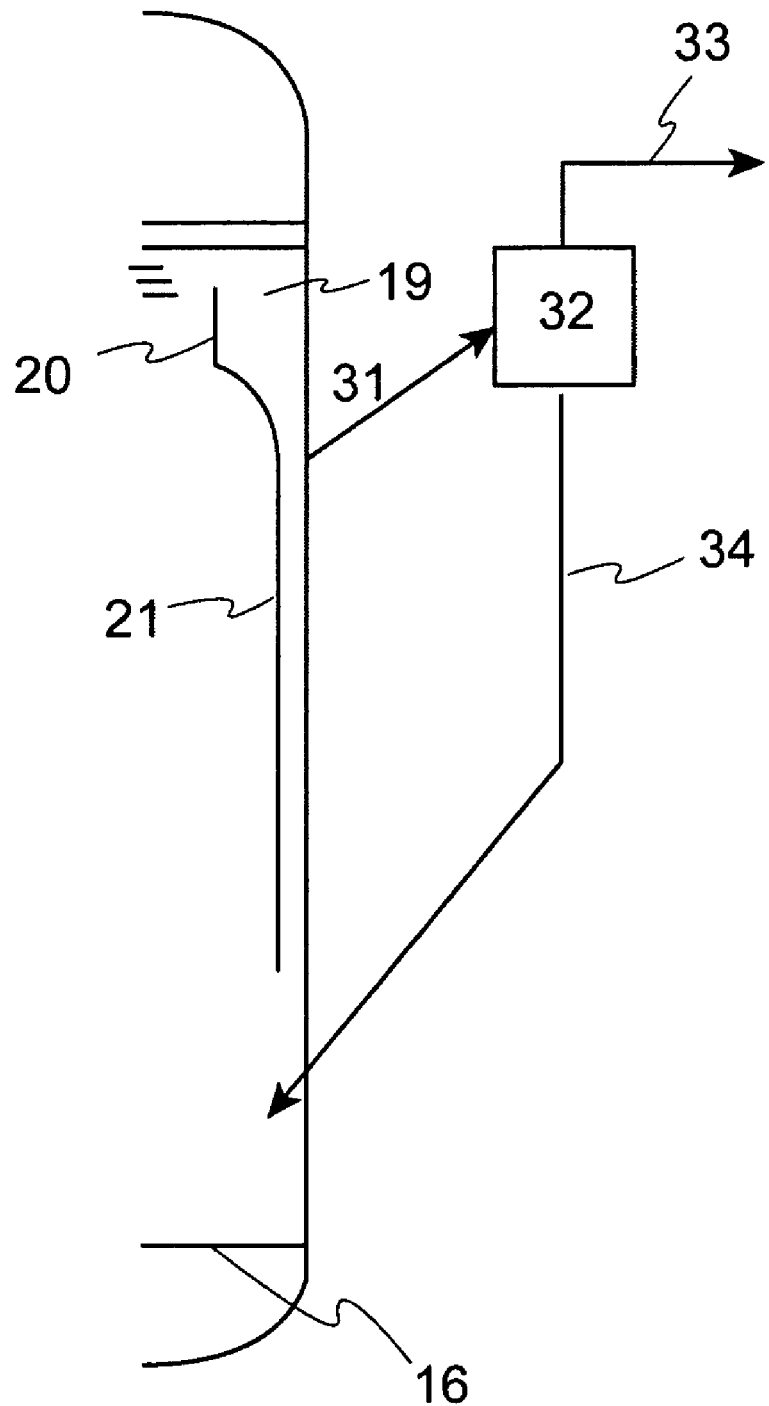
FIG. 4 is a partial schematic diagram representing yet another alternate embodiment of the invention.

Optionally, of course, the slurry can be withdrawn, as shown in FIG. 4, from the main vertical section 21 of an internal downcomer for separation and further treatment similar to that shown in FIG. 3.

By operating the slurry process in a non-homogeneous manner as described herein, the liquids-solids separation is simplified. Indeed, the present invention makes it possible to eliminate the use of filters to separate solids from the liquid removed from the slurry bubble column. This is done by reducing the solids concentration in the slurry sent to liquid-solids separation.

EXAMPLES

A computer model of the slurry reactor system was used to illustrate the solid catalyst distribution in a slurry bed as a function of slurry bed height. The model couples reaction kinetics with slurry bubble hydrodynamics. In making the computation, the model was provided with the feed composition, reaction temperature and pressure, the catalyst type, density and particle size distribution, and the reactor geometry. The catalyst concentration for both a slumped bed operation and a dispersed bed operation was determined and shown graphically in FIG. 5. As can be seen, operating in a slumped bed mode is capable of achieving much less than about 20 wt % catalyst concentration as the reactor height increases. The same effect can also be achieved by decreasing the reactor downcomer height. As can be seen in FIG. 5, the slurry catalyst concentration in a dispersed bed operation starts to decrease rapidly once the slurry level is above the downcomer height, which in this example is 66 feet.

What is claimed is:

1. A method for separating slurry liquid from catalyst in a three-phase slurry process, the method comprising:

operating the slurry process under conditions sufficient to provide an upper region in the slurry bed where the slurry solids concentration is lower than about 20 wt % and a lower region in the bed where the solids concentration in the slurry is higher than about 20 wt % of catalyst;

degassing a portion of the slurry in the upper region of the slurry bed;

introducing the degassed slurry into a separation device to provide a liquid stream comprising substantially slurry liquid and a stream comprising catalyst particles; and returning the stream comprising catalyst particles to the slurry bed.

2. The method of claim 1 wherein the three-phase slurry process is operated under slumped bed conditions.

3. The method of claim 1 wherein the three-phase slurry process is operated in a reactor having one or more slurry circulating downcomers under conditions to form a slurry bed that has a height greater than the height of the downcomers thereby providing an upper region in the slurry bed where the slurry contains about 20 wt % or less of catalyst.

4. The method of claim 2 or 3 wherein the slurry is degassed in a downcomer having a top end located in the upper region of the slurry bed and a main section extending to a lower region of the of the slurry bed.

5. The method of claim 4 wherein degassed slurry is withdrawn from the top end of the downcomer for introduction into a separation device.

6. The method of claim 4 wherein the degassed slurry is withdrawn from the main section of the downcomer for introduction into a separation device.

* * * * *